US012172079B2

(12) United States Patent
Carter, Jr. et al.

(10) Patent No.: US 12,172,079 B2
(45) Date of Patent: Dec. 24, 2024

(54) ROUTE GENERATION SYSTEM WITHIN A VIRTUAL ENVIRONMENT OF A GAME APPLICATION

(71) Applicant: Electronic Arts Inc., Redwood City, CA (US)

(72) Inventors: Ben Folsom Carter, Jr., Longwood, FL (US); Benjamin Scott Rich, Jr., Orlando, FL (US); Jonathan Douglas Hayes, Orlando, FL (US)

(73) Assignee: Electronic Arts Inc., Redwood City, CA (US)

( * ) Notice: Subject to any disclaimer, the term of this patent is extended or adjusted under 35 U.S.C. 154(b) by 371 days.

(21) Appl. No.: 17/384,224

(22) Filed: Jul. 23, 2021

(65) Prior Publication Data
US 2023/0025389 A1 Jan. 26, 2023

(51) Int. Cl.
*A63F 13/56* (2014.01)
*A63F 13/57* (2014.01)
*A63F 13/65* (2014.01)
*A63F 13/812* (2014.01)

(52) U.S. Cl.
CPC .............. *A63F 13/56* (2014.09); *A63F 13/57* (2014.09); *A63F 13/65* (2014.09); *A63F 13/812* (2014.09)

(58) Field of Classification Search
CPC .......... A63F 13/56; A63F 13/57; A63F 13/65; A63F 13/812; A63F 13/23; A63F 13/55; A63F 13/67; A63F 13/80; A63F 13/573; A63F 13/577; A63F 13/828; A63F 13/5375; A63F 2300/6607; A63F 2300/5553; A63F 2300/64; A63F 2300/643; A63F 2300/646
See application file for complete search history.

(56) References Cited

U.S. PATENT DOCUMENTS

| | | | |
|---|---|---|---|
| 8,860,732 B2 * | 10/2014 | Popovic | G06T 13/40 345/473 |
| 9,978,425 B2 * | 5/2018 | Kirk | G11B 27/19 |
| 10,388,053 B1 * | 8/2019 | Carter, Jr. | G06T 13/80 |
| 10,406,437 B1 * | 9/2019 | Scheurwater | A63F 13/825 |
| 11,097,189 B2 * | 8/2021 | Alderman | A63F 13/573 |
| 11,113,860 B2 * | 9/2021 | Rigiroli | G06N 3/042 |
| 11,217,003 B2 * | 1/2022 | Akhoundi | G06T 17/20 |
| 11,235,241 B2 * | 2/2022 | Scheurwater | A63F 13/30 |
| 11,562,523 B1 * | 1/2023 | Starke | G06V 40/103 |
| 11,648,480 B2 * | 5/2023 | Akhoundi | G06N 3/088 706/11 |
| 11,673,048 B2 * | 6/2023 | Alderman | A63F 13/837 463/31 |
| 11,830,121 B1 * | 11/2023 | Starke | G06N 3/02 |
| 2004/0063501 A1 | 4/2004 | Shimokawa et al. | |
| 2005/0071306 A1 * | 3/2005 | Kruszewski | A63F 13/10 345/473 |

(Continued)

*Primary Examiner* — William H McCulloch, Jr.
(74) *Attorney, Agent, or Firm* — Knobbe, Martens, Olson & Bear, LLP

(57) ABSTRACT

The systems and processes described herein can provide dynamic and realistic route generation based on actual route data within the game environment. The system provides for generating a route database for use with a sports simulation game application. The present disclosure also provides for generation of routes during runtime of the game application. The route generation system can help address the problem of generating realistic and lifelike routes based on real life movements of athletes.

20 Claims, 11 Drawing Sheets

(56) References Cited

U.S. PATENT DOCUMENTS

| | | | |
|---|---|---|---|
| 2007/0004481 A1* | 1/2007 | Riccio | A63F 13/812 |
| | | | 463/1 |
| 2007/0198178 A1 | 8/2007 | Trimby et al. | |
| 2010/0271367 A1* | 10/2010 | Vaden | A63F 13/213 |
| | | | 348/157 |
| 2012/0100911 A1* | 4/2012 | Rejen | A63F 13/52 |
| | | | 463/31 |
| 2012/0244942 A1* | 9/2012 | Meyer | A63F 13/533 |
| | | | 463/43 |
| 2016/0314818 A1* | 10/2016 | Kirk | G06F 3/04845 |
| 2018/0043257 A1* | 2/2018 | Stevens | G06T 11/60 |
| 2020/0070053 A1* | 3/2020 | Scheurwater | G06F 3/04812 |
| 2021/0220739 A1* | 7/2021 | Zinno | G06N 3/08 |
| 2021/0394067 A1* | 12/2021 | Saito | A63F 13/57 |
| 2022/0226728 A1 | 7/2022 | Scheurwater | |
| 2023/0025389 A1* | 1/2023 | Carter, Jr. | A63F 13/812 |

\* cited by examiner

FIG. 2C

| | | Asset Name | DepthChartPosition_EGS | PTM_WayPoint_Path_Query_Max_Speed | PTM_WayPoint_Path_Query_Rel_Move_Angle | DistanceToFirstDown.ifg |
|---|---|---|---|---|---|---|
| 1 | ✕ | ⊕ ʂNGSP_Michael_Thomas_WR_GameId2019102707_PlayId1943_SubPath ◁ ☐ WR | | 0.1100, 0.1500 | 24.5100, 60.0000 | 8.0000, 12.0000 |
| 2 | ✕ | ⊕ ʂNGSP_Michael_Thomas_WR_GameId2019090900_PlayId1110_SubPath ◁ ☐ WR | | 0.1000, 0.1400 | 41.7600, 60.0000 | 8.0000, 12.0000 |
| 3 | ✕ | ⊕ ʂNGSP_Michael_Thomas_WR_GameId2019090900_PlayId2200_SubPath ◁ ☐ WR | | 0.1000, 0.1400 | 40.3900, 60.0000 | 8.0000, 12.0000 |
| 4 | ✕ | ⊕ ʂNGSP_Michael_Thomas_WR_GameId2019091512_PlayId1762_SubPath ◁ ☐ WR | | 0.0900, 0.1300 | -48.2100, 60.0000 | 8.0000, 12.0000 |
| 5 | ✕ | ⊕ ʂNGSP_Michael_Thomas_WR_GameId2019092211_PlayId2095_SubPath ◁ ☐ WR | | 0.1000, 0.1400 | -35.6100, 60.0000 | 21.0000, 25.0000 |
| 6 | ✕ | ⊕ ʂNGSP_Michael_Thomas_WR_GameId2019101303_PlayId2776_SubPath ◁ ☐ WR | | 0.1000, 0.1400 | 42.3200, 60.0000 | 18.0000, 22.0000 |
| 7 | ✕ | ⊕ ʂNGSP_Michael_Thomas_WR_GameId2019102707_PlayId852_SubPath ◁ ☐ WR | | 0.0800, 0.1200 | 65.9600, 60.0000 | 8.0000, 12.0000 |
| 8 | ✕ | ⊕ ʂNGSP_Michael_Thomas_WR_GameId2019111706_PlayId1231_SubPath ◁ ☐ WR | | 0.0900, 0.1300 | 50.9200, 60.0000 | 1.0000, 5.0000 |
| 9 | ✕ | ⊕ ʂNGSP_Michael_Thomas_WR_GameId2019112405_PlayId873_SubPath ◁ ☐ WR | | 0.1100, 0.1500 | 39.1700, 60.0000 | 8.0000, 12.0000 |
| 10 | ✕ | ⊕ ʂNGSP_Michael_Thomas_WR_GameId2020010500_PlayId949_SubPath ◁ ☐ WR | | 0.1100, 0.1500 | 41.5900, 60.0000 | 8.0000, 12.0000 |
| 11 | ✕ | ⊕ ʂNGSP_Keenan_Allen_WR_GameId2019092210_PlayId624_SubPath ◁ ☐ WR | | 0.0900, 0.1300 | -58.7100, 60.0000 | 8.0000, 12.0000 |
| 12 | ✕ | ⊕ ʂNGSP_Keenan_Allen_WR_GameId2019092210_PlayId2667_SubPath ◁ ☐ WR | | 0.1000, 0.1400 | -20.4200, 60.0000 | 11.0000, 15.0000 |
| 13 | ✕ | ⊕ ʂNGSP_Michael_Williams_WR_GameId2019100610_PlayId1992_SubPath ◁ ☐ WR | | 0.1200, 0.1600 | -45.5500, 60.0000 | 6.0000, 10.0000 |
| 14 | ✕ | ⊕ ʂNGSP_Keenan_Allen_WR_GameId2019111800_PlayId84_SubPath ◁ ☐ WR | | 0.1100, 0.1500 | -57.9700, 60.0000 | 8.0000, 12.0000 |
| 15 | ✕ | ⊕ ʂNGSP_Rod_Godwin_WR_GameId2019080952_PlayId200_SubPath ◁ ☐ WR | | 0.0900, 0.1300 | -55.3300, 60.0000 | 1.0000, 5.0000 |

```
NGS_Routes_Master.cdb
 1 DepthChartPosition_EGS: WR
 2 NGSRouteType_From_MaddenRoutType_Fieldvalue: In
 3 ClosestDefenderOffset_x. fgs: 10.198
 4 ClosestDefenderOffset_z. fgs: -0.119
 5 DistanceToFirstDown. fgs: 9.881
 6 ReceiverStartPos_x. fgs: 17.787
 7 ReceiverStartPos_z. fgs: 17.985
 8 PTM_WayPoint_Path_Query_Max_Speed: 0.170
 9 PTM_WayPoint_Path_Query_Rel_Move_Angle: 59.062519
 # -- Perfect
                                                            1 2 3 4 5 6 7 8 9
Asset
 .  -- Zero
 252 NGSP_Michael_Gallup_WR_GameId20191120500_PlayId3093_SubPath..   # # # # # # # # #
 250 NGSP_Rod_Godwin_WR_GameId20191100603_PlayId4101_SubPath..       # 9 9 9 9 # 9 9 9
 248 NGSP_Michael_Gallup_WR_GameId20191120500_PlayId4096_SubPath..   # # # 9 # # 9 # #
 247 NGSP_Mike_Evans_WR_GameId20190092209_PalyId1952_SubPath..       # 9 9 9 # 9 9 9 #
 245 NGSP_Rod_Godwin_WR_GameId20191101300_PlayId4625_SubPath..       # # 9 9 9 9 9 9 #
 245 NGSP_Marvin_Hall_WR_GameId20190092903_PlayId4795_SubPath..      # # 9 9 # 9 9 9 #
 243 NGSP_Keon_Hatcher_WR_GameId20191081052_PlayId2111_SubPath..     # 9 # 9 9 # 9 9 #
 243 NGSP_Arthur_Brown_WR_GameId20191102008_PlayId1566_SubPath..     # 9 9 9 9 9 9 9 #
 242 NGSP_Mike_Evans_WR_GameId20191101300_PlayId4021_SubPath..       # 9 # 9 # 9 9 9 #
 242 NGSP_Tyler_Boyed_WR_GameId20191112403_PalyId3712_SubPath..      # 9 9 9 # 9 # 9 #
 242 NGSP_Michael_Thomas_WR_GameId20191112405_PlayId3769_SubPath..   # 9 9 9 9 9 9 # #
 241 NGSP_Breshad_Perriman_WR_GameId20191111706_PlayId2230_SubPath.. # 9 9 9 9 9 9 9 #
 240 NGSP_Kenneth_Golladay_WR_GameId20190090809_PlayId805_SubPath..  # 9 # 9 # 9 9 9 #
 239 NGSP_Mike_Evans_WR_GameId20190092209_PlayId72_SubPath..         # 9 9 9 9 9 9 # #
 239 NGSP_Arthur_Brown_WR_GameId20190090801_PlayId2401_SubPath..     # 9 9 9 9 9 9 9 #
 238 NGSP_Arthur_Brown_WR_GameId20191013l0_PlayId2050_SubPath..      # 9 # 9 # 9 9 9 #
 238 NGSP_Michael_Gallup_WR_GameId20200011900_PlayId81_SubPathy..    # # 9 9 # 9 9 # #
 238 NGSP_Arthur_Brown_WR_GameId20201011l0_PlayId1377_SuPath..       # 9 9 9 9 9 9 9 #
 238 NGSP_Rashard_Higgins_WR_GameId20191111007_PlayId1108_SubPath..  # # 9 9 9 9 9 9 #
 237 NGSP_Samuel_Watkins_WR_GameId20191111007_PlayId1108_SubPath..   # # 9 9 9 9 # 9 #
```

| Override? | Asset Name | Mirror | Score | Dist | Player | DbMod | LastLeg | Valid | Note |
|---|---|---|---|---|---|---|---|---|---|
| Clear | | | | | | | | | |
| Override | NGSP_Chistian_Conley_WR_GameId20191110300_PlayId3234_SubPath | | 2.39 | 1.99 | 0.00 | 0.48 | 30,42 | 0.0 | Valid |
| Override | NGSP_Denniston_Moore_WR_GameID20191098888_PlayId2124_Path | | 3.08 | 2.38 | 0.00 | 0.70 | 31,37 | 0.0 | Valid |
| Override | NGSP_Arthur_Brown_WR_GameId202881988_PlayId81_SubPath | M | 3.79 | 2.09 | 0.00 | 1.70 | 27,35 | 0.0 | Valid |
| Override | NGSP_Alex_Erickson_WR_GameId20191102002_PlayId1828_SubPath | M | 3.85 | 1.95 | 0.00 | 1.90 | 28,39 | 0.0 | Valid |
| Override | NGSP_Mike_Evans_WR_GameId20191098811_PlayId553_SubPath | | 1003.21 | 2.51 | 0.00 | 0.70 | 28,48 | 1000.0 | TooFar |
| Override | NGSP_Rod_Godwin_WR_GameId20191188603_PlayId4181_SubPath | | 1003.31 | 2.81 | 0.00 | 0.50 | 34,38 | 1000.0 | TooFar |
| Override | NGSP_Michael_Gallup_WR_GameId20191120500_PlayId3093_SubPath | | 1003.39 | 3.09 | 0.00 | 0.30 | 26,38 | 1000.0 | TooFar |
| Override | NGSP_Mike_Evans_WR_GameId20191892209_PlayId2288_SubPath | | 1003.71 | 2.51 | 0.00 | 1.20 | 26,37 | 1000.0 | TooFar |
| Override | NGSP_Michael_Gallup_WR_GameId20191120500_PlayId4096_SubPath | | 1003.71 | 3.01 | 0.00 | 0.70 | 26,42 | 1000.0 | TooFar,NoLastLeg |
| Override | NGSP_Marvin_Hall_WR_GameId20191092983_PlayId4795_SubPath | | 1003.76 | 2.76 | 0.00 | 1.00 | 33,49 | 1000.0 | TooFar |
| Override | NGSP_Denniston_Moore_WR_GameId20191092208_PlayId1898_SubPath | | 1003.82 | 2.72 | 0.00 | 1.10 | 24,37 | 1000.0 | TooFar,NoLastLeg |
| Override | NGSP_Tyler_Boyd_WR_GameId20191112403_PlayId3712_SubPath | M | 1004.16 | 2.86 | 0.00 | 1.30 | 27,33 | 1000.0 | TooFar |
| Override | NGSP_Mike_Evans_WR_GameId20191101300_PlayId2721_SubPath | M | 1004.24 | 2.64 | 0.00 | 1.60 | 29,36 | 1000.0 | TooFar |
| Override | NGSP_Christian_Conley_WR_GameId20191102002_PlayId2102_SubPath | | 1004.41 | 2.91 | 0.00 | 1.50 | 33,41 | 1000.0 | TooFar |
| Override | NGSP_Samuel_Watkins_WR_GameId20191111007_PlayId1108_SubPath | | 1004.68 | 2.88 | 0.00 | 1.80 | 29,45 | 1000.0 | TooFar |
| Override | NGSP_Breshd_Perriman_WR_GameId20191111786_PlayId2230_SubPath | | 1004.73 | 3.33 | 0.00 | 1.40 | 20,21 | 1000.0 | TooFar,TooShort |
| Override | NGSP_Rod_Godwin_WR_GameId20191120808_PlayId547_SubPath | M | 1004.91 | 3.11 | 0.00 | 1.80 | 38,53 | 1000.0 | TooFar |
| Override | NGSP_Davante_Adams_WR_GameId20191122388_PlayId3377_SubPath | M | 1004.93 | 3.63 | 0.00 | 1.30 | 34,39 | 1000.0 | TooFar |
| Override | NGSP_Breshad_Perriman_WR_GameId20191111786_PlayId2948_SubPath | M | 1004.97 | 4.27 | 0.00 | 0.70 | 28,22 | 1000.0 | TooFar,TooShort |
| Override | NGSP_Arthur_Brown_WR_GameId20191100668_PlayId3312_SubPath | M | 1005.14 | 3.84 | 0.00 | 1.30 | 23,35 | 1000.0 | TooFar |
| Override | NGSP_Mike_Evans_WR_GameId20191102708_PlayId2848_SubPath | M | 1005.26 | 3.16 | 0.00 | 2.10 | 26,36 | 1000.0 | TooFar |
| Override | NGSP_Christian_Conley_WR_GameId20191122881_PlayId3462_SubPath | M | 1005.38 | 4.28 | 0.00 | 1.10 | 23,28 | 1000.0 | TooFar |
| Override | NGSP_Michael_Gallup_WR_GameId20191989801_PlayId3689_SubPath | M | 1005.42 | 4.12 | 0.00 | 1.30 | 38,36 | 1000.0 | TooFar |
| Override | NGSP_Arthur_Brown_WR_GameId20191102002_PlayId2401_SubPath | M | 1005.43 | 3.83 | 0.00 | 1.60 | 26,32 | 1000.0 | TooFar |
| Override | NGSP_Marvin_Jones_WR_GameId20191110307_PlayId1164_SubPath | M | 1005.45 | 3.55 | 0.00 | 1.90 | 31,44 | 1000.0 | TooFar |

FIG. 5B

ROUTE GENERATION SYSTEM WITHIN A VIRTUAL ENVIRONMENT OF A GAME APPLICATION

BACKGROUND

In video games, the game application can generate routes for in-game characters to move through virtual environments to reach a destination, such as a pass route in a football game. Generally, routes within a game have a start point and an end point. For example, in a football game each in-game character may follow a defined linear path from the start to the end of an assigned pass route. In more complex games, the game application may be configured to generate routes for many different in-game characters within the game environment. For example, a video game may be generating routes for multiple different characters running different pass routes for individual plays.

SUMMARY OF SOME EMBODIMENTS

The systems, methods, and devices of this disclosure each have several innovative aspects, no single one of which is solely responsible for the all of the desirable attributes disclosed herein.

One embodiment discloses a computer-implemented method for route generation within a game environment of a game application: by a hardware processor configured with computer executable instructions, executing a game application comprising a game environment, the game environment comprising at least one player-controlled character and a plurality of non-player controlled characters, the plurality of in-game characters configured to be controlled by the game application; accessing a plurality of routes stored in a route database, wherein each route of the plurality of routes is generated based on data collected from movement performed along the route by a real world person; receiving user input, from a user computing system, the user input requesting at least one actions to be performed by at least one of the plurality of non-player controlled characters during an in-game event; in response to the user input, determining a first in-game waypoint path for a first non-player controlled character within the game environment; filtering the plurality of routes based on characteristics associated with a first route using on first route filtering criteria resulting in a first subset of routes; analyzing the subset of routes based on route selection characteristics; selecting a first route of the first subset of routes based on the route selection characteristics; generating a character path for the first non-player controlled character, the character path comprising a start point and a destination point based, at least in part, on the first route, the character path comprising motion data associated with movement of the first non-player controlled character along the first path; and outputting the first route for execution by the first non-player controlled character prior to initiation of the in-game event.

In some embodiments, the method includes generating pose data for animation of the first non-player controlled character based on the motion data; selecting a pose from a pose database based on the pose data, wherein the pose data stored in the pose database is based on motion capture data; and rendering the selected pose within the virtual environment. In some embodiments, motion data for the first character path includes position, orientation, speed, and acceleration. In some embodiments, the first route filtering criteria include at least one of route type or relative move angle. In some embodiments, the route selection characteristics include at least one of distance to defenders, distance to first down, receiver position, max speed, relative move angle, character position. In some embodiments, analyzing the subset of routes based on route selection characteristics includes generating a score based on at least one of length of the route from the path, end of path relative to end of route, character position, or athlete that ran the original route. In some embodiments, generating a character path includes combining the selected route as a segment with a procedurally generated segment to form the character path. In some embodiments, the procedurally generated segment of the character path is generated based on real world pathing data. In some embodiments, the route selection characteristics discards routes that do not satisfy a defined threshold. In some embodiments, the character path is a pose trajectory matching path.

Another embodiment discloses computing system comprising: a data store storage device configured to store computer readable instruction configured to execute a game application and a route database comprising a plurality of routes, wherein each of the routes is generated based on data collected from movement performed along the route by a real world person; a processor configured to execute the game application, the game application configured to generate a game environment, the game application comprising a route generation engine configured to: receiving user input, from a user computing system, the user input requesting at least one actions to be performed by at least one of the plurality of non-player controlled characters during an in-game event; in response to the user input, determining a first in-game waypoint path for a first non-player controlled character within the game environment; filtering the plurality of routes based on characteristics associated with a first route using on first route filtering criteria resulting in a first subset of routes; analyzing the subset of routes based on route selection characteristics; selecting a first route of the first subset of routes based on the route selection characteristics; generating a character path for the first non-player controlled character, the character path comprising a start point and a destination point based, at least in part, on the first route, the character path comprising motion data associated with movement of the first non-player controlled character along the first path; and outputting the first route for execution by the first non-player controlled character prior to initiation of the in-game event.

In some embodiments, the route generation engine is further configured to: generate pose data for animation of the first non-player controlled character based on the motion data; select a pose from a pose database based on the pose data, wherein the pose data stored in the pose database is based on motion capture data; and render the selected pose within the virtual environment. In some embodiments, the motion data for the first character path includes position, orientation, speed, and acceleration. In some embodiments, the first route filtering criteria includes at least one of route type or relative move angle. In some embodiments, the route selection characteristics includes at least one of distance to defenders, distance to first down, receiver position, max speed, relative move angle, character position. In some embodiments, the route generation engine is further configured to generate a score based on at least one of length of the route from the path, end of path relative to end of route, character position, or athlete that ran the original route when analyzing the subset of routes based on route selection characteristics. In some embodiments, the route generation engine is further configured to combine the selected route as a segment with a procedurally generated segment to form the character path when generating a character path. In some embodiments, the procedurally generated segment of the character path is generated based on real world pathing data. In some embodiments, the route selection characteristics discards routes that do not satisfy a defined threshold. In some embodiments, the character path is a pose trajectory matching path.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIGS. 2A-2C illustrate embodiments of a process for generation of a route database.

FIGS. 5A and 5B illustrate embodiment of route selection characteristics for use when selecting and generating a route within a game environment.

DETAILED DESCRIPTION OF EMBODIMENTS

Overview

Figure 1:
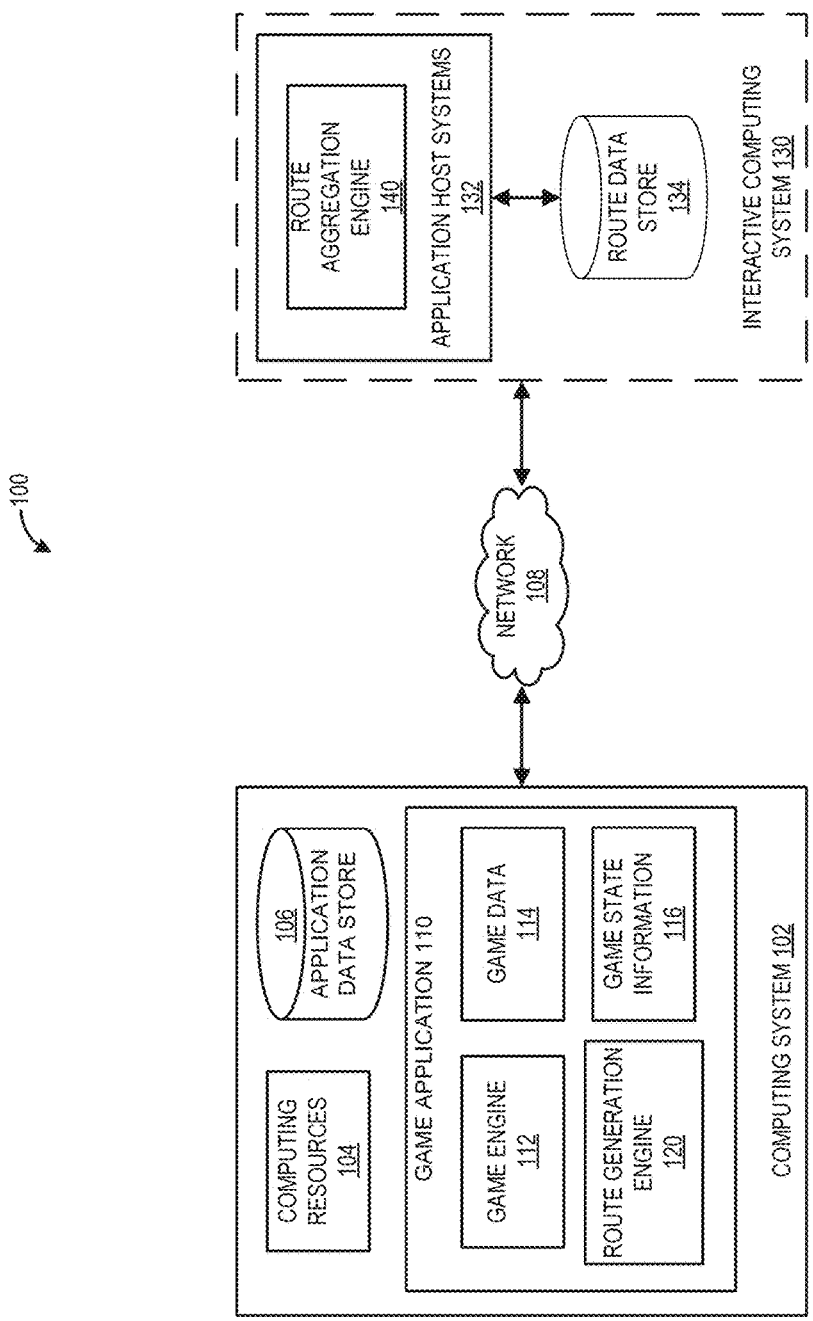
FIG. 1 illustrates an embodiment of a computing environment that can implement one or more embodiments of a route generation system.

One of the problems encountered in video games is that the routes run by characters within a game are generally not very lifelike. For example, characters will move in perfectly straight lines and turn at unnaturally precise angles. The characters also generally accelerate and move at speeds that are not achievable in reality. This can result in movements and animations that are not realistic or lifelike. In games, such as sports simulations, this can break the sense of immersion and realism within the game. In addition, many of the locomotion movements and animations used for the characters in sports or simulation games are based on motion capture movements of people performing the same or similar actions. The motion capture data used for the animations can be difficult to match to the movement of the characters in the games due to the unnatural movements, speeds, and accelerations of the characters within the game, which can further reduce the realistic simulation produced by the game.

One solution to aspects of the problem is to base the routes of character within the game on actual routes that have been performed by athletes in real life games. One of the difficulties in following this approach is capturing data associated with the routes that are run by athletes within a game. One option is to analyze video data to determine the routes run by athletes within the game. However, even with video tracking technology, it can be difficult to get precise information on the movement of the athletes within the game. Another option, which will be further described herein, is to track data of the athletes during a game using tracking devices located on the athletes. For example, athletes may have tracking chips in their shoes, shoulder pads, gloves, or other game equipment, such as a football, racquet, hockey stick, bat, or a ball. The tracking chips can be used to gather telemetry data for each athlete during a game. This telemetry data can be used to evaluate movement of the athletes during the game and to identify routes that the athletes are running. The routes can then be analyzed and added to a database of available routes that can be followed by virtual characters within the game application. The telemetry data can be divided into sections according to defined event intervals, such as a play within a football game. As the length of an event interval can be indeterminate, the telemetry data can include start and stop times for each play.

The telemetry data for each route can include physical route data that identify the specific movements performed by the player during the route, such as trajectory, speed, acceleration, and position. The telemetry data for each route can have metadata associated with the athletes as well as the game in which the route was run. For example, the metadata can identify the specific athlete within the game running the route during a specific play. The metadata may additionally include information that relates to other athletes within the game, such as the position of other athletes on the athlete's team or on the opposing team. The metadata can be used as additional contextual data that can be used for identifying and determining a route to pick by the game application during runtime of game application.

The telemetry data can be processed and stored in a database as a subpath that be used by the game application during runtime. The subpath can be used by the game application to generate more realistic running routes that can be executed by characters during runtime of the game application. This can result in more realistic run routes during a game and more realistic animations associated with the generated routes of the game. This database can be installed locally on the game application which can allow it to be used during the game application.

During runtime of the game application, at each event interval, such as prior to the start of a play, the user can provide input to the game application to select a play for execution within the game application. This execution of the play by the character can include athletes on the team that are not being controlled by the user. These characters are controlled by an artificial intelligence (AI) controller of the game application that controls execution of the characters until the user takes control. The game application assigns routes to characters based on the input provided by the user. For example, a play selected by the user can assign three different pass routes to characters on the user's team. The game application can then generate waypoint paths for the character(s) within the virtual environment based on the assigned route(s).

The route generation engine can query the database to identify a subset of the total available routes that satisfy initial route gating criteria. The route gating criteria can be used to eliminate the majority of routes in the route database that do not satisfy a type and/or direction of the route. For example, the gating criteria can eliminate all routes that are not a slant route. The remaining subset of routes can then be scored in order to identify routes that are the best match for the assigned route. There can be a plurality of different selection criteria used to select the best match for the route.

After the route is selected from the route database, the route generation engine can generate a pose trajectory matching (PTM) path for the character based on the route data. The PTM path can include the selected path and procedurally generated path data to fill in any path data that is missing from the selected route. For example, the procedurally generated data can extend the path beyond the end of the route data. The PTM path can include the movement data that is used by the animation and rendering system to generate poses of the character at each frame. For example, the speed, position, orientation, and trajectory information can be used to match the locomotion of the character to pose data in an animation database. Since the data associated with the route is based on actual movement characteristics of athletes, the animation system can better match the movement data to the pose data for the character. This can result in more lifelike and realistic movements and animation of the characters during runtime of the game.

The systems and processes described herein can provide dynamic and realistic route generation based on actual route data within the game environment. As will be further described herein, the present disclosure relates to a system for generating a route database for use with sports simulation game application. The present disclosure also provides for generation of routes during runtime of the game application. The route generation system can help address the problem of generating realistic and lifelike routes based on real life movements of athletes. Although the processes described herein will be generally applied to football games, the same systems and processes can be uses to generate routes in other sports games or applications where the system is controlling or animating movement of characters within the game that mimic real life actions. For example, the process could be used to control movements of characters within a crowd of people or a group of characters charging into combat.

For purposes of this disclosure the term "user" can refer to a person that is operating a computing device in order to control the operation of a game application. For purposes of this disclosure the term "character" can refer to a virtual avatar or character that a user can control within a game application. The character can be a person, vehicle, object, and/or any virtual entity that the user can control within the game application. For purposes of this disclosure, the term "athlete" refers to a real world person that is competing in a sporting event or other real world activity.

Overview of Video Game Environment

FIG. 1 illustrates an embodiment of a computing environment 100 for implementing a route generation engine 120 and a route aggregation engine 140. The environment 100 includes a network 108, a plurality of user computing systems 102 and an interactive computing system 130, which includes application host systems 132 and a route data store 134. To simplify discussion and not to limit the present disclosure, FIG. 1 illustrates only one user computing system 102 and one interactive computing system 130, though multiple systems may be used.

The user computing system 102 may communicate via a network 108 with the interactive computing system 130. Although only one network 108 is illustrated, multiple distinct and/or distributed networks 108 may exist. The network 108 can include any type of communication network. For example, the network 108 can include one or more of a wide area network (WAN), a local area network (LAN), a cellular network, an ad hoc network, a satellite network, a wired network, a wireless network, and so forth. In some embodiments, the network 108 can include the Internet.

Computing System

The computing system 102 includes computing resources 104 and an application data store 106. The user computing system 102 may have varied local computing resources 104 such as central processing units and architectures, memory, mass storage, graphics processing units, communication network availability and bandwidth, and so forth. Further, the user computing system 102 may include any type of computing system. For example, the user computing system 102 may be any type of computing device, such as a desktop, laptop, video game platform/console, television set-top box, television (for example, Internet TVs), network-enabled kiosk, car-console device, computerized appliance, wearable device (for example, smart watches and glasses with computing functionality), and wireless mobile devices (for example, smart phones, PDAs, tablets, or the like), to name a few. A more detailed description of an embodiment of a computing system 102 is described below with respect to FIG. 7.

Game Application

The user computing system 102 can execute a game application 110 based on software code stored at least in part in the application data store 106. The game application 110 may also be referred to as a videogame, a game, game code and/or a game program. A game application 110 should be understood to include software code that a computing device 102 can use to provide a game for a user to play. A game application 110 may comprise software code that informs a computing device 102 of processor instructions to execute, but may also include data used in the playing of the game, such as data relating to constants, images, route information, and other data structures. In the illustrated embodiment, the game application 110 includes a game engine 112, game data 114, game state information 116, and a route generation engine 120.

In some embodiments, the user computing system 102 is capable of executing a game application 110, which may be stored and/or executed in a distributed environment. For example, the user computing system 102 may execute a portion of a game and a network-based computing system, may execute another portion of the game. For instance, the game may be a multiplayer sports game, such as a football game where multiple users play the game competitively or cooperatively, that includes a client portion executed by the user computing system 102 and a server portion executed by one or more application host systems 132.

Game Engine

The game engine 112 can be configured to execute aspects of the operation of the game application 110 within the computing device 100. Execution of aspects of gameplay within a game application can be based, at least in part, on the user input received, the game data 114, and game state information 116. The game data 114 can include game rules, prerecorded motion capture poses/paths, environmental settings, constraints, skeleton models, route information, and/or other game application information.

The game engine 112 can execute gameplay within the game according to the game rules. Examples of game rules can include rules for scoring, possible inputs, actions/events, movement in response to inputs, and the like. Other components can control what inputs are accepted and how the game progresses, and other aspects of gameplay. The game engine 112 can receive the user inputs and determine in-game events, such as actions, jumps, runs, throws, attacks and other events appropriate for the game application 110. During runtime operation, the game engine 112 can read in game data 114 and game state information 116 to determine the appropriate in-game events.

In one example, after the game engine 112 determines the character events, the character events can be conveyed to a movement engine that can determine the appropriate motions and poses that the characters should make in response to the events and movement within the virtual environment. The movement engine can use motion matching processes to determine poses for characters. For example, motion characteristics generated by a PTM path can be used to create realistic animations of the character. The motion characteristics can be used to select poses for the character during locomotion of the character along the PTM path. The pose selection process for the character can uses a pose matching process to determine the pose to render at each frame. The pose matching process can use the motion characteristics of the character at each positional point along the path to determine a pose that is the best match for the character. The pose matching system can match the speed and position information to poses in a pose database in order to select the proper pose. The new poses for the characters can be provided to a skinning and rendering engine.

The skinning and rendering engine, in turn, can provide character images to an object combiner in order to combine animate, inanimate, and background objects into a full scene. The full scene can be conveyed to a renderer, which generates a new frame for display to the user. The process can be repeated for rendering each frame during execution of the game application. Though the process has been described in the context of a character, the process can be applied to any process for processing events and rendering the output for display to a user.

Game Data

The game data 114 can include game rules, prerecorded motion capture poses/paths, environmental settings, environmental objects, constraints, skeleton models, route information, and/or other game application information. At least a portion of the game data 114 can be stored in the application data store 106. In some embodiments, a portion of the game data 114 may be received and/or stored remotely, such as in the route data store 134, in such embodiments, game data may be received during runtime of the game application.

Game State Information

During runtime, the game application 110 can store game state information 116, which can include a game state, character states, environment states, scene object storage, route information and/or other information associated with a runtime state of the game application 110. For example, the game state information 116 can identify the state of the game application 110 at a specific point in time, such as a character position, character orientation, character action, game level attributes, and other information contributing to a state of the game application. The game state information can include dynamic state information that continually changes, such as character movement positions, and static state information, such as the identification of a game level within the game.

Route Generation Engine

The route generation engine 120 can perform various functions to provide route generation functionality within the game application 110 and can operate during runtime of the game application 110. The route generation engine 120 can use route information stored in the game data 114 or received from the route aggregation engine to perform various route generation functions as will be described herein. In some embodiments, the route generation engine 120 can receive route information from the interactive computing system 130 prior to execution of the game application, such as in an update to the game application. In some embodiments, the game application 110 may receive route information from the interactive computing system 130 during runtime. In such embodiments, the route generation engine 120 can dynamically update route information within the game application 110 based on the information received from the interactive computing system 130 during runtime. The route generation engine 120 can provide dynamic routing information within game environment. Functions of the route generation engine 120 can include dynamically determining routes of characters during runtime of the game application based on input from the user, and other route generation functions within the game environment. Various aspects of the operation of the route generation engine 120 are described in further detail below.

Interactive Computing System

The interactive computing system 130 can include one or more application host systems 132 and a route data store 134. The interactive computing system 130 may include one or more computing systems configured to execute a portion of the game application 110. In some embodiments, the one or more application host systems 132 can include one or more computing devices, such as servers and databases that may host and/or execute a portion of one or more instances of the game application 110. In certain embodiments, instead of or in addition to executing a portion of the game application 110, the application host systems 132 may execute another application, which may complement and/or interact with the application 110 during execution of an instance of the application 110, such as the route aggregation engine 140.

Application Host System

The interactive computing system 130 may enable multiple users or computing systems to access a portion of the game application 110 executed or hosted by the interactive computing system 130. The interactive computing system 130 can include a route aggregation engine 140. In some embodiments, the host application system 132 may execute a hosting system for executing various aspects of a game environment. For example, in one embodiment, the game application 110 can record the location of characters within the game environment. In some embodiments, the game application 110 may be a single player game in which the interactive computing system 130 provides additional functionality when connected to the instance of the game application 110. For example, the interactive computing system 130 can provide additional route information to the route generation engine 120 based on aggregated information received from a plurality of users operating the same game application 110. In some embodiments, the application host system 132 can provide a dedicated hosting service for hosting multiplayer game instances or facilitate the creation of game instances hosted by user computing devices. In some embodiments, the host application system 132 can provide a lobby or other environment for users to virtually interact with one another.

Route Aggregation Engine

The route aggregation engine 140 can provide for generation of a route database for providing route generation functionality for the game application 110. The route aggregation engine 140 can be configured to compile and aggregate route information based on telemetry data received for athletes within the real world for use within a virtual environment of the game application 110. The route information and the telemetry data can be gathered and aggregated from a plurality of external systems and data sources. In some embodiments, the route information can be gathered from third party systems that compile the telemetry data during real life events, such as sporting events. For example, the telemetry data can be generated based on data tracking devices worn by athletes during a football game.

The route aggregation engine 140 can be configured to generate a route database for generation of routes in the virtual environments within the game application 110. In some embodiments, a game application 110 may include a plurality of game environments. The route aggregation engine 140 may store routes for each game environment. The route aggregation engine 140 can be configured to use telemetry data to automatically generate routes. The automatically generated routes can be combined with procedurally generated routes to generate PTM paths within the virtual environment. The telemetry data may be manipulated and filtered to remove aspects of routes that do not satisfy criteria for use within a game application. For example, the route data received can include movement by an athlete that occurs after a play is over. Aspects of the operation of the route aggregation engine 140 are discussed in more detail below.

Route Data Store

The interactive computing system 130 can include one or more route data stores 134 that are configured to store route information associated with game application 110 hosted by the interactive computing system 130 and/or the application host systems 132. The route data store 134 can include route information associated with the game application 110 that is generated and aggregated by the route aggregation engine 140. The route information can be filtered and processed so that it is usable within the game application. The route information can include physical route data and metadata for each route, and other information used by the route aggregation engine 140. The physical route data can provide the information recorded during the route taken at defined intervals, such as the position (e.g., x, y, z, position), orientation on the field, speed, acceleration, events occurring within the game (e.g., pass, tackle, out of bounds, etc.), and other information that is recorded during movement of the athlete along the path. The metadata can include information associated with the game and the route. For example, the metadata may include the athlete name, athlete number, athlete ID(s), game ID, play ID, athlete position, route type, play direction, distance to first down, positions of other athletes relative to athlete, and other such as information associated with the route.

Route Generation

Figure 2A:
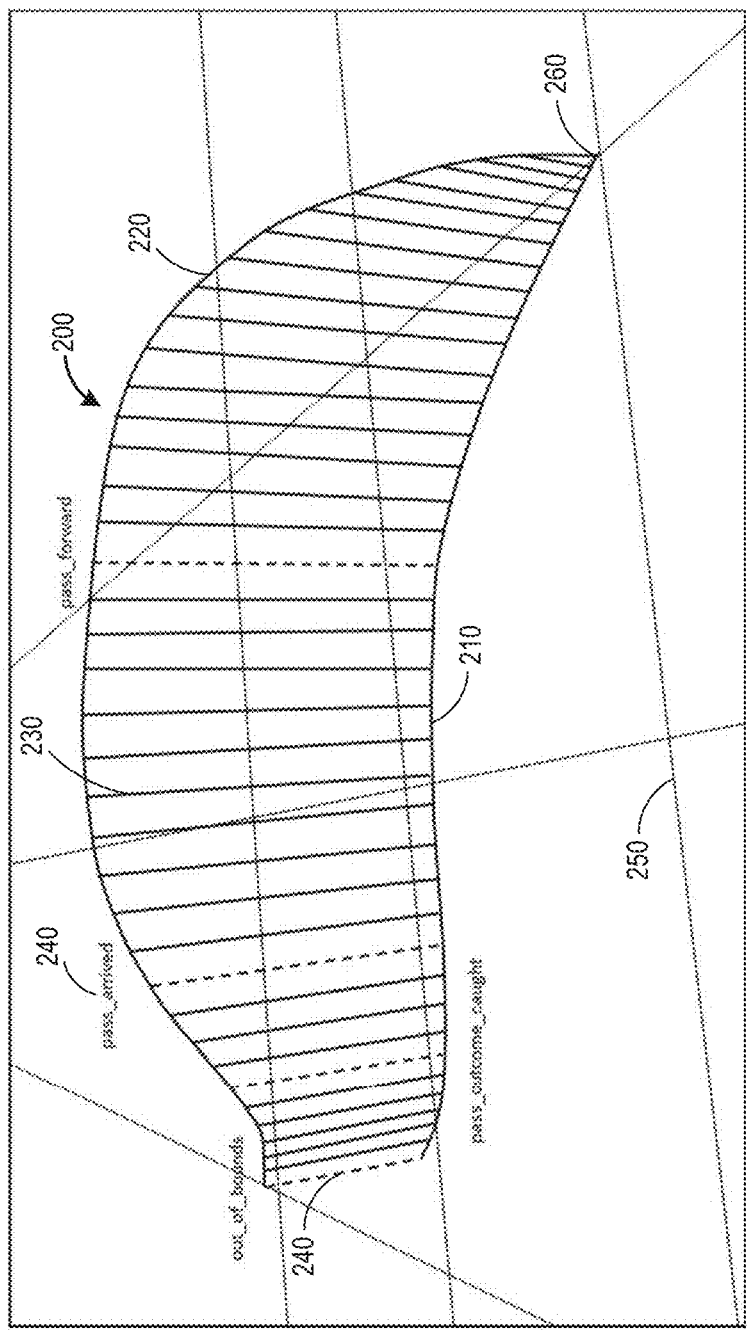
Figure 2B:
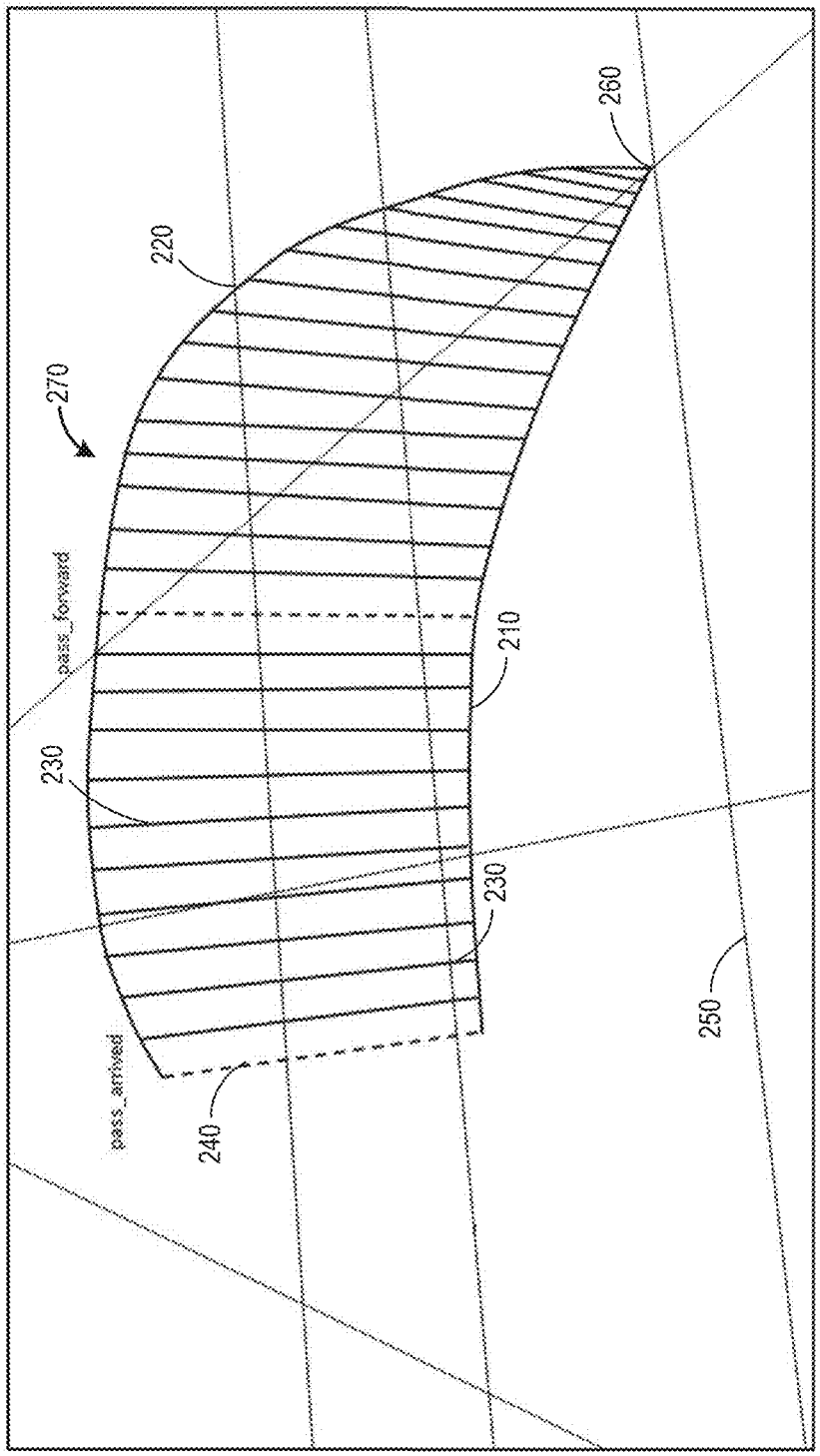

FIGS. 2A-2C illustrate embodiments of various functions and routines that can be implemented by the route aggregation engine 140 in order to generate route information for the use within the game application 110. The route aggregation engine can be configured to aggregate, analyze, and process telemetry data generated by athletes during real life sporting events in order to generate the route information used within the game application. The route information can be provided by the route aggregation engine 140 to the route generation engine 120 for use during runtime. The route aggregation engine 140 can be configured to generate the route information for installation with the game application 110 or after the game application has been installed, such as in a game update.

Telemetry Data

Telemetry data can be collected from the athletes during a sporting event by a third party collection service and can be provided to the route aggregation engine 140 for processing. The telemetric data 220 can be recorded from the athletes using a plurality of tracking devices disposed on the athletes during the game. For example, the tracking devices can be RFID tags placed on athletes and/or objects within the game, such as the ball. The telemetry data can be used to capture real-time location data, speed and acceleration for athletes, during each play over the entire playing field. In an example embodiment, sensors throughout the stadium track tags placed on athletes' shoulder pads, which can be used to determine individual movements within inches. Examples of telemetry data for a route are illustrated in FIG. 2A. As illustrated in FIG. 2A, the raw route data 220 is overlaid over a grid 250 within a virtual environment. The telemetry data for each route can include physical route data and route metadata. Physical route data may include information recorded during the route taken at defined intervals (such as, every 0.1 seconds, or other time period), such as the position (e.g., x, y, z, position), orientation on the field, speed, acceleration, events occurring within the game (e.g., pass, tackle, out of bounds, etc.), and other information that is recorded during movement of the athlete along the path. The metadata can include information associated with the game and the route. For example, the metadata may include the athlete name, athlete number, athlete ID(s), game ID, play ID, athlete position, route type, play direction, distance to first down, positions of other athletes relative to athlete, and other such as information associated with the route. The route aggregation engine 140 can aggregate the telemetric data received from the third party. The telemetry data can include hundreds of thousands of data points separated into individual routes for each event period, such as each play in the game.

Subpath Generation

FIGS. 2A and 2B illustrate generation of a subpath 270 from raw route data 200. FIG. 2A illustrates an example of the raw telemetry data 200 for a route on a grid 250. The illustrated virtual environment is provided for visualization of the path data. The path data comprises a start point 260, the athlete trajectory 210, the athlete movement speed 220, and the lines 230 are indicative of points at which data was collected during the route. For example, the data may be collected every 0.1 seconds. The route data includes game events 240 that were generated during the route. For example, pass_forward indicates when the quarterback released the ball, followed by pass_arrived, pass_outcome_caught, and out_of_bounds. The game events 240 can be used to extract relevant data from the route and remove route data that is not useful for generating routes within the game application.

As illustrated, the position of the player veers upwards toward the end of the route, which is because the athlete caught the ball at pass_outcome_caught and turned downfield to run toward the end zone. The athlete's speed also dips as he catches the ball. The athlete then runs out of bounds at out_of_bounds. The movement of the athlete after the ball has been caught no longer represents the movement of the athlete along a pass route. Accordingly, the route data can be processed to remove and discard data that is not relevant to the pass route being run by the athlete. The portion of the route that is saved for later use can be referred to as a subpath. FIG. 2B illustrates subpath 270 generated after the route data has been filtered and processed. In this case the subpath was created by discarding the route data after the game event pass_arrived.

Other routes may include additional usable route data after a pass has been thrown and caught. For example, an athlete may continue to run the pass route even after the pass was thrown to and caught by another athlete. The route information for each route received by the route aggregation engine 140 can be analyzed, filtered, and processed before being included in the route database. In some embodiments, the developers can manually process the route data to ensure that each route utilizes the correct subpath that is relevant to the pass route. In some embodiments, a system may be configured to automatically filter and process the data. For example, the route aggregation engine 140 can utilize an algorithm to process the telemetry data 220 in order to filter and discard data based on an analysis of the physical route data and metadata, such as, for example, game events, speed, orientation, and trajectory.

Embodiment of Route Database

FIG. 2C illustrates an embodiment of a selection of routes within a route database after filtering and processing the telemetric data. Each row 280 of the route database can correspond to a single subpath for use by the route generation system within the game application. The subpath data can include characteristics that can be used to filter the route data during runtime route generation. The subpath characteristics can be taken directly from the telemetry data, or can be derived from telemetry data. For example, the telemetry data can be used to derive the maximum speed the athlete reached during the route. In the illustrated embodiment, the columns provide data for subpath name 290A, athlete position 290B, maximum athlete speed 290C, movement angle 290D, and distance to first down 290E. The database can include as many subpath characteristics as desired. In some embodiments, the subpath data includes a subset of the total characteristics included in the raw route data, which can reduce the storage space required to store the data and the processing power required to search the subpath data during runtime. After the database is complete, the database can be included in the game application for use during runtime. The route database may be included with the game code of the application, provided after during an update to the game, or provided to the game application during runtime over a network.

Route Database Generation Process

Figure 3:
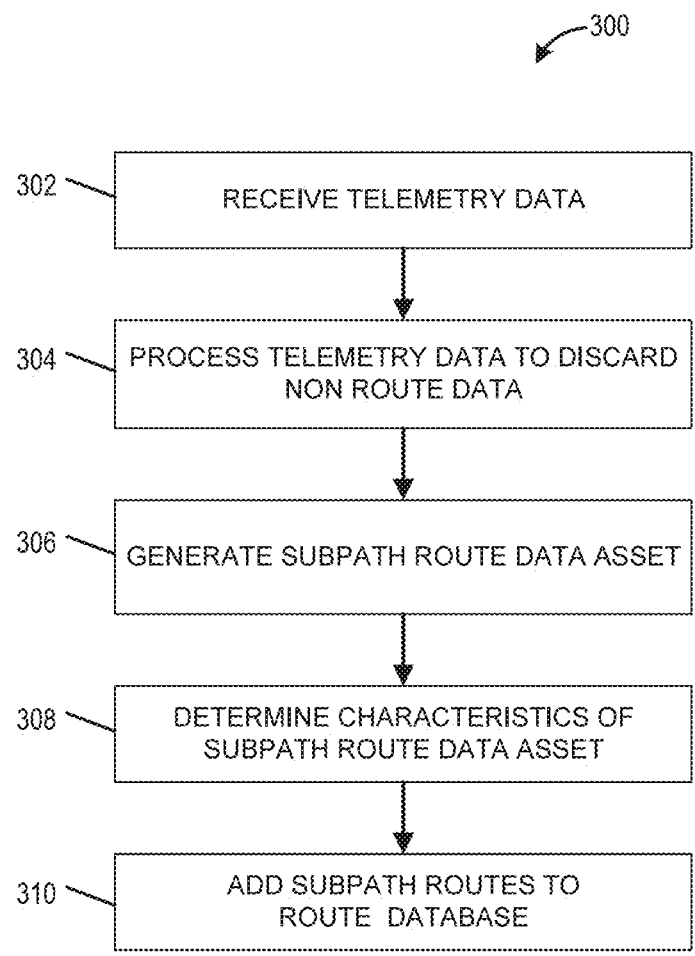
FIG. 3 illustrates a flowchart of an embodiment of a process for generating a route database.

FIG. 3 illustrates an embodiment of a flowchart of a process for generating a database of routes for use within a game application. The process 300 can be implemented by any system that can aggregate and process telemetry data for a game application. For example, the process 300, in whole or in part, can be implemented by a route aggregation engine 140, an interactive computing system 130, an application host system 132, and/or another system. Although any number of systems, in whole or in part, can implement the process 300, to simplify discussion, the process 300 will be described with respect to particular systems. Further, although embodiments of the process 300 may be performed with respect to variations of systems comprising various game application environments, to simplify discussion, the process 300 will be described with respect to the interactive computing system 130.

At block 302, the computing system receives telemetry data. The telemetry data can be collected from athletes during a sporting event by a third party collection service and can be provided to the system for processing. The telemetric data can be recorded from the athletes using a plurality of tracking devices disposed on the athletes during the sporting event.

At block 304, the system processes each route included in the telemetry data. The telemetry data can be divided by event segments, such as a play in a football game. The route data can include the physical route data recorded during the event segment and associated metadata. For example, the physical route data can include a start point, the athlete trajectory, athlete movement speed, and game events that were generated during the route collected at defined intervals over the event segment. In some embodiments, the system can generate a visual representation of the route data for review by a developer.

At block 306, the system can generate a subpath route data asset from the route data. The subpath route data asset can be generated by processing the route data to extract the route data relevant to the pass route of the athlete. The processing can include discarding route data that is not relevant to the pass route being analyzed. In some embodiments, developers can manually process the route data to identify the correct subpath that is relevant to the pass route. In some embodiments, a system may be configured to automatically filter and process the data. For example, the route aggregation engine 140 can utilize an algorithm to process the telemetry data 220 in order to filter and discard data based on an analysis of the physical route data and metadata, such as, for example, game events, speed, orientation, and trajectory.

At block 308, the system can determine characteristics of the subpath route data asset. The system can derive characteristics based on the characteristics included in the telemetry data, such as maximum speed of the athlete on the route.

At block 310, the system can add the subpath route to the route database. The route database can be configured to include selection characteristics that can be used to filter the route data during runtime route generation. The system may reduce the number of characteristics or data associated with the subpath route, which can help to reduce the storage space of the route database. For example, the system may remove characteristics included in the raw telemetry data that are not relevant to the selection of a route within the game application.

Embodiments of Route Generation Process

Figure 4:
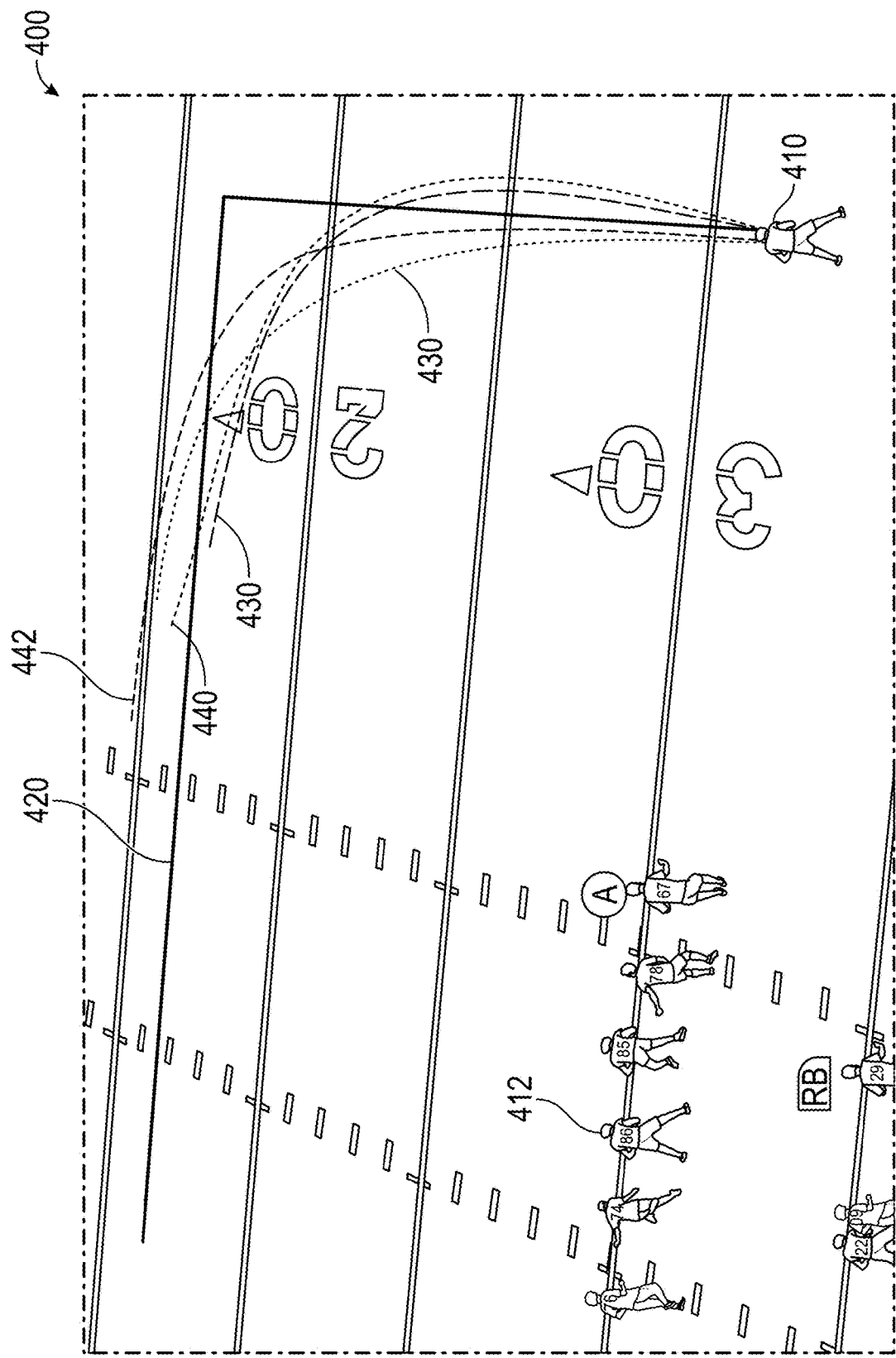
FIG. 4 illustrates an embodiment of route generation within a game environment.

FIG. 4 illustrates an embodiment of a game environment 400 illustrating aspects of route generation within the game application 110. The route generation engine 120 is configured to generate a path for the character within the game environment based on the subpath route data stored in the route database. The route generation engine 120 can generate a route based on the subpath route data that is more realistic and similar to routes that are run by actual athletes during a game. The route generation engine 120 is configured generate a PTM path for the character by matching a waypoint path assigned to the character with the subpath route data stored in the route database. The route generation engine 120 is also configured to procedurally generate path data to supplement portions of the waypoint route that are not included in selected subpath route data that matches the waypoint path.

FIG. 4 illustrates an example interface of a virtual game environment 400. A character 410 is positioned at a first location and has a waypoint path 420. The game environment 400 comprises a plurality of other characters 412 on the game field. The character 410 is configured to move through the game environment 400 and to generally follow the waypoint path assigned to the character based on game input provided by a user. For example, a user may select a play identifying the waypoint path 420 from a playbook identifying plays within the game. Each waypoint path has a defined type (e.g., out, slant, corner, etc.) and a relative move angle (e.g., whether the path goes left or right). The waypoint path 420 is constructed from a series of waypoint assignments. Each assignment can identify a direction and distance. A waypoint path 420 is then created for the character from the waypoint assignments using the positional data within the virtual environment. For example, as illustrated, the waypoint path 420 is generated that extends down field and then includes a 90 degree left turn across the field.

The route generation engine 120 can filter the available routes based on characteristics of the subpath routes. The initial filtering criteria can be referred to as gating criteria and is used to reduce the number of routes that could be possible matches for the generated waypoint path. In some embodiments, the gating criteria can include route type and relative move angle. When attempting to match the waypoint path to routes within the route database, the route generation engine 120 performs this initial filtering step to eliminate subpath routes in the database that could not satisfy the waypoint path type and direction. An example of the gating criteria used to filter the routes is further illustrated in FIG. 5A.

Figure 5A:
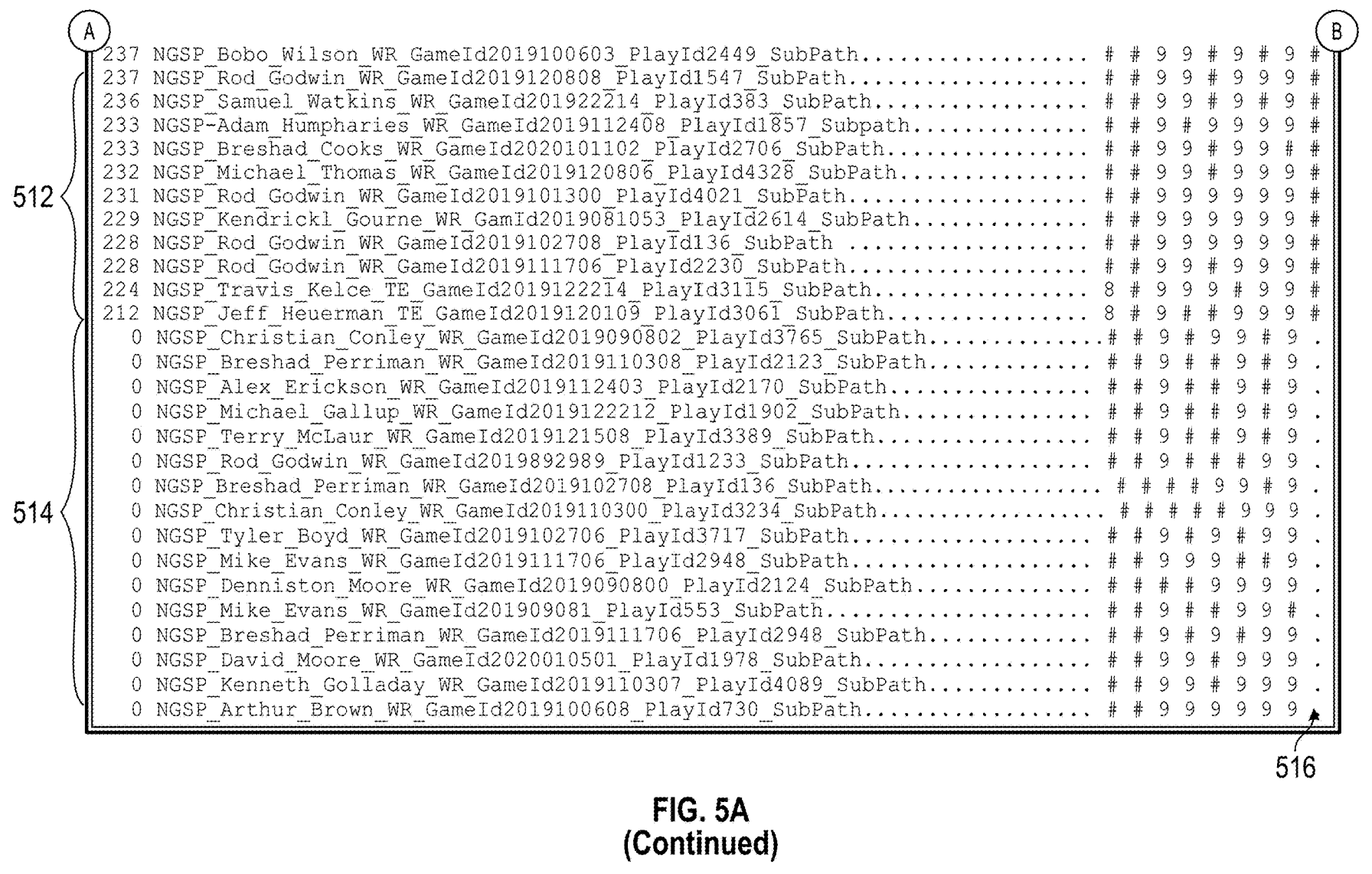

With reference to FIG. 5A, the interface 500 illustrates sample gating criteria 510 that can be used for the initial query to the route database. In the illustrated embodiment, the system includes nine different characteristics that are used as the gating criteria. If any one of the gating criteria fails, the subpath route is not considered as a viable match for the waypoint path. As illustrated, a subset of the subpath routes 512 have a score and subpath routes 514 below have no score. In the illustrated embodiment, the highest score is 255 and a zero is considered a failure. In the illustrated interface, the subpath routes 514 did not satisfy the last gating criterion 516, which corresponds to the relative move angle of the subpath route. Accordingly, the subpath routes 514 have not been scored and will not be considered as a match for the waypoint path.

The route generation engine 120 can use the filtering step to quickly identify a subset of the total available subpath routes that could satisfy the characteristics of the generated waypoint path. This process can eliminate a majority of the total subpath routes and significantly reduces computation costs for scoring each of the remaining routes and selecting a subpath route.

The subset of available subpath routes can then then be further analyzed based on the subpath characteristics using defined route selection criteria. The selection criteria can be used to score one or more of the subpath characteristics of each subpath route to determine how closely the subpath routes match the in-game situation. In the illustrated embodiment in FIG. 4, the routes 430 were not selected and route 440 was selected. An example of the scoring criteria is illustrated in FIG. 5B.

With reference to FIG. 5B, the interface 550 illustrates the list of potential matches 560. The potential match 562 was selected and is illustrated as line 440 in FIG. 4. Matches 564 are close matches that are illustrated by lines 430 in FIG. 4. The route generation engine 120 analyzes the physical route data to see which subpath route most closely matches the waypoint path. In some embodiments, the maximum distance of the subpath route from the waypoint path can be used as a base score, and then the base score can be modified based on how good the score generated during the initial filtering step, and additional criteria 570, such as whether the in-game player matches the athlete that ran the original route.

At this stage, the scoring criteria can include additional thresholds can be used to further reject routes. For example, routes can be rejected where the subpath route has a maximum distance from the waypoint path that is greater than a defined threshold. With further reference to FIG. 4, a visual representation of the greatest distance from the subpath route and the waypoint path is illustrated by lines 442.

Subpath routes may also be rejected if one of the legs of the subpath route does not match all the legs of the waypoint path. In the illustrated embodiment, the subpath route with the lowest score selected as the subpath route. The route selection criteria can further eliminate subpath routes that do not extend far enough or extend too far.

After the subpath route is selected, the route generation engine 120 can generate a pose trajectory matching (PTM) path for the character based on the selected subpath route. The PTM path generated by the route generation engine 120 can include procedurally generated path segments for instances where the subpath route does not extend a sufficient distance to match the total distance of the waypoint path. The segments of the PTM path that are generated procedurally can be generated using real world data, such as motion capture data. The generation of the PTM path is completed before the play is initiated. The PTM paths can be initiated from a stationary position of the character at the start of the play. The route generation engine 120 generates a PTM path for each character based on the assigned waypoint path and the selected subpath route.

The PTM path includes motion characteristics that are used by the graphics engine to select character poses and generate locomotion animations of the character. The motion data included in the PTM can include the position, speed, trajectory, orientation, acceleration, and other motion characteristics. The PTM path can use an acceleration curve that is generated based on real world data. The acceleration curve can serve as the basis for movement of the character along the PTM path. The PTM path can define a speed that the character is to run at, which can be scaled based on the speed of the character assigned to run the PTM path. For different in-game characters, generally, the positional path that the character follows would be the same, however, the speed at which the character moves along the points of the path may be scaled based on the speed and/or acceleration characteristics of the in-game character.

During runtime, the motion characteristics generated by the PTM path can be used to create realistic animations of the character. The motion characteristics can be used to select poses for the character during locomotion of the character along the PTM path. The pose selection process for the character can uses a pose matching process to determine the pose to render at each frame. The pose matching process can use the motion characteristics of the character at each positional point along the path to determine a pose that is the best match for the character. The pose matching system can match the speed and position information to poses in a pose database in order to select the proper pose. As the PTM path includes realistic speed and position data, the pose data for the character can be better matched to the pose data in a pose database. In this manner, more realistic movement and animation can be generated during runtime of the game application.

Route Generation Process

Figure 6:
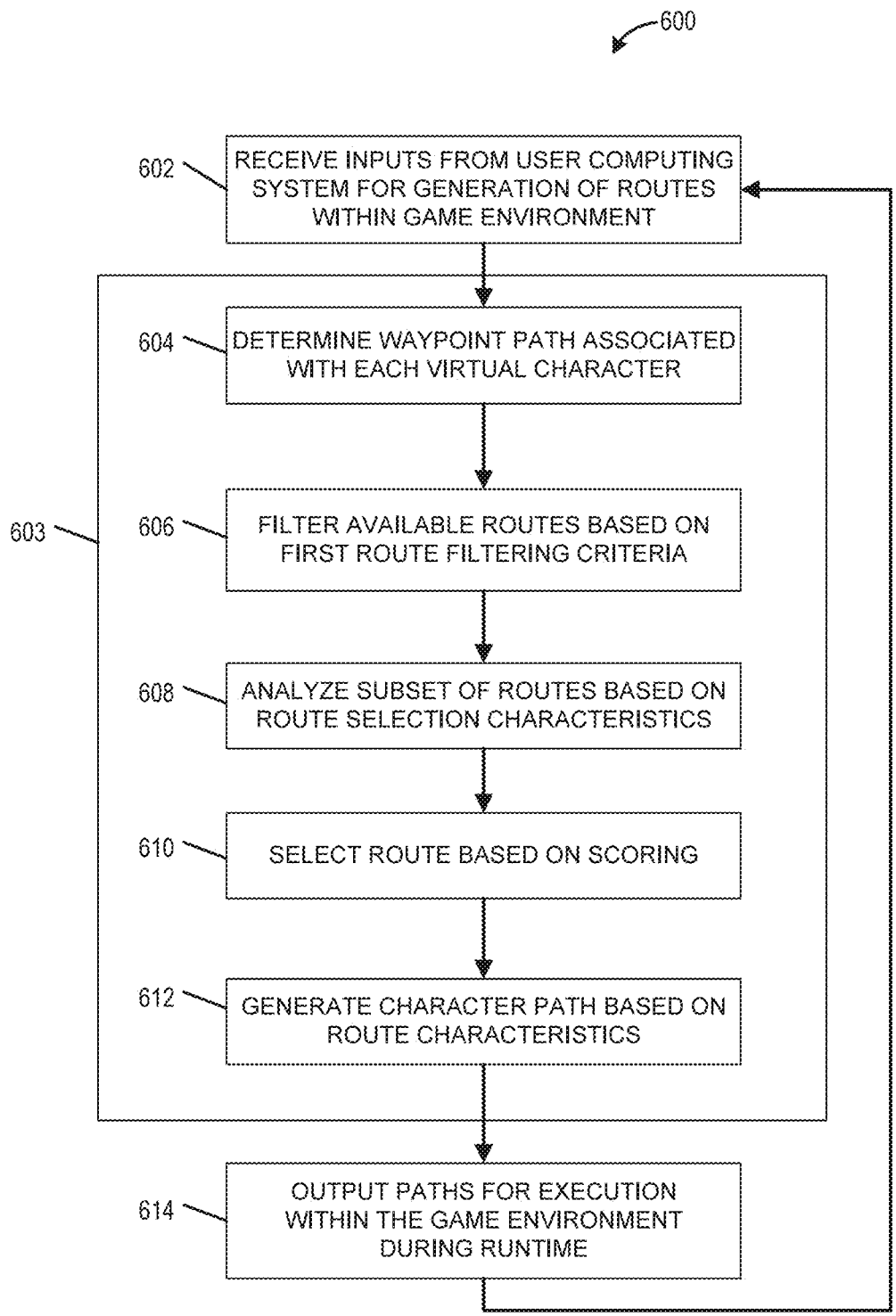
FIG. 6 illustrates an embodiment of a flowchart of an embodiment of a route generation process.

FIG. 6 illustrates an embodiment of a flowchart for a process for route generation of characters within a game environment of a game application. The process 600 can be implemented by any system that can execute and run a game application. For example, the process 600, in whole or in part, can be implemented by a game application 110, a game engine 114, a route generation engine 130, an interactive computing system 130, an application host system 132, and/or another system. Although any number of systems, in whole or in part, can implement the process 600, to simplify discussion, the process 600 will be described with respect to particular systems. Further, although embodiments of the process 600 may be performed with respect to variations of systems comprising various game application environments, to simplify discussion, the process 600 will be described with respect to the computing system 102.

At block 602, the route generation engine receives input from a user computing system selecting an action within the virtual environment that requires the generation of one or more character routes within the virtual environment. For example, the user may select a play including pass routes for at least one character on the user's football team.

Block 603 represents the subprocess for generating a PTM path for each of the one or more character routes within the virtual environment. The process is performed for each waypoint path prior to the initiation of the action requested by the user. For example, the subprocess can be completed for each of the characters prior to the initiation of the play within a football game.

At block 604, the route generation engine generates a waypoint path for each of the character routes requested based on the user input. The waypoint path is constructed from a series of waypoint assignments. Each assignment can identify a direction and distance. A waypoint path can be created for the character from the waypoint assignments using the positional data within the virtual environment.

At block 606, the route generation engine can filter available subpath routes stored in the route databased based on first filtering criteria resulting in a subset of available subpath routes. The route generation engine can query the route database to identify potential subpath routes. The route generation engine can filter the available routes based on characteristics of the subpath routes. The first filtering criteria can be referred to as gating criteria and is used to reduce the number of routes that could be possible matches for the generated waypoint path. In some embodiments, the gating criteria can include route type and relative move angle. If any one of the gating criteria fails, the subpath route is not considered as a viable match for the waypoint path. The subpath routes that are considered potential matches may additionally receive an initial score.

At block 608, the route generation engine analyzes the subset of available subpath routes based on route selection criteria. The selection criteria can be used to score one or more of the subpath characteristics of each subpath route to determine how closely the subpath routes match the in-game situation. In some embodiments, the maximum distance of the subpath route from the waypoint path can be used as a base score, and then the base score can be modified based on how good the score generated during the initial filtering step in block 606. The score can also be modified by additional criteria, such as whether the in-game player matches the athlete that ran the original route. The route selection criteria can include additional thresholds can be used to further reject routes. For example, routes can be rejected where the subpath route has a maximum distance from the waypoint path that is greater than a defined threshold. Subpath routes may also be rejected if one of the legs of the subpath route does not match all the legs of the waypoint path. The scoring criteria can further eliminate subpath routes that do not extend far enough or extent too far.

At block 610, the route generation engine selects a route based on the route selection characteristics.

At block 612, the route generation engine 120 generates a PTM path based on the selected route. The PTM path can be a combination of the subpath route segment and a procedurally generated segment. The PTM path includes motion characteristics that are used by the graphics engine to select character poses and generate locomotion animations of the character. The motion data included in the PTM path can include the position, speed, trajectory, orientation, acceleration, and other motion characteristics. The PTM path can use an acceleration curve that is generated based on real world data. The acceleration curve can serve as the basis for movement of the character along the PTM path.

At block 614, the route generation engine 120 outputs the PTM paths for execution within the virtual environment. During runtime, the motion characteristics generated by the PTM path can be used to create realistic animations of the character. The motion characteristics can be used to select poses for the character during locomotion of the character along the PTM path. The pose selection process for the character can use a pose matching process to determine the pose to render at each frame. The pose matching process can use the motion characteristics of the character at each positional point along the path to determine a poses that is the best match for the character.

Overview of Computing Device

Figure 7:
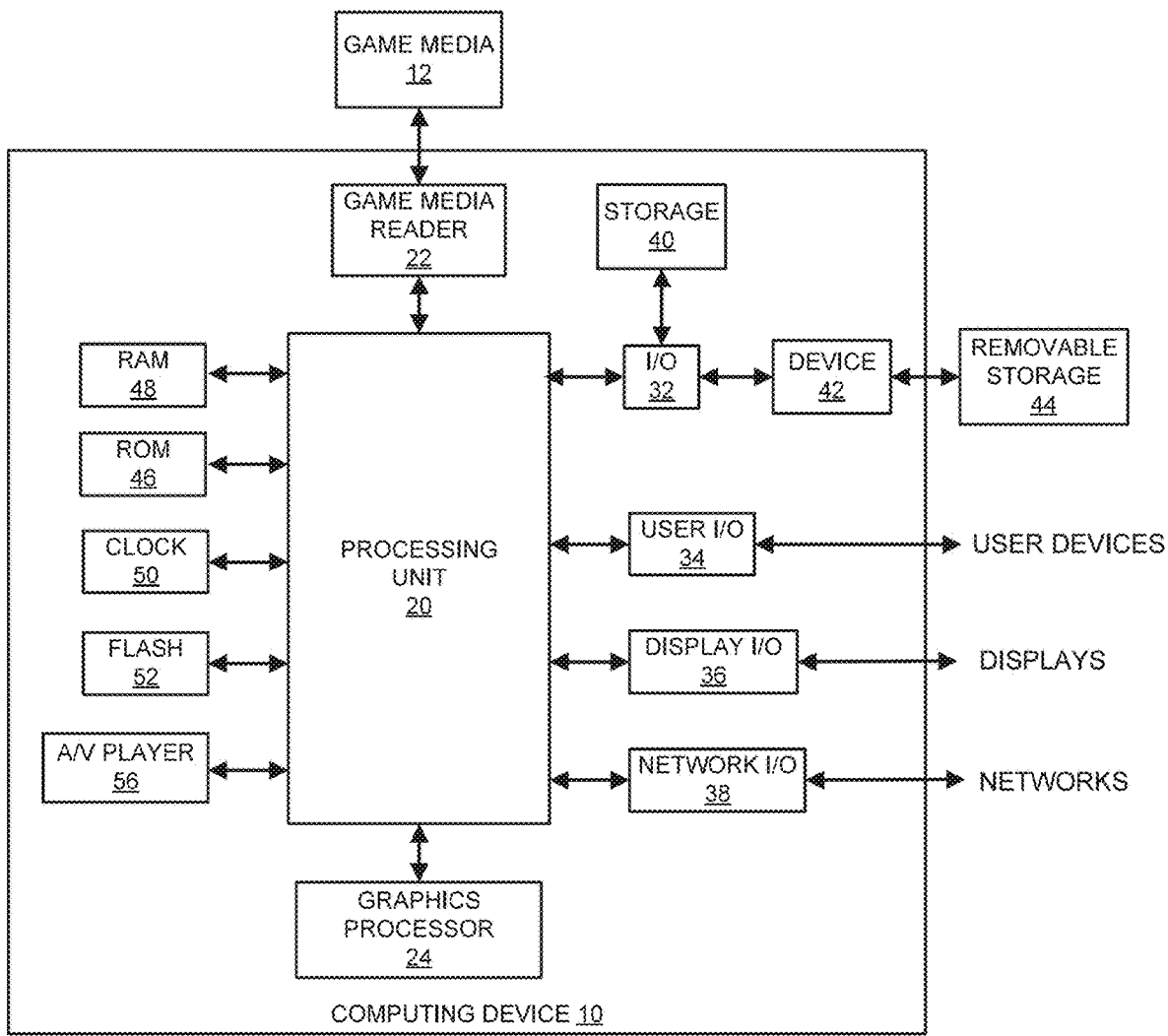
FIG. 7 illustrates an embodiment of a computing device.

FIG. 7 illustrates an embodiment of computing device 10 according to the present disclosure. Other variations of the computing device 10 may be substituted for the examples explicitly presented herein, such as removing or adding components to the computing device 100. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/ output functions for a network. Network I/O 38 may be used during execution of a game, such as when a game is being played online or being accessed online.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video athlete 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method for route generation within a game environment of a game application:
   by a hardware processor configured with computer executable instructions,
   executing a game application comprising a game environment, the game environment comprising at least one player-controlled character and a plurality of non-player controlled characters, the plurality of non-player controlled characters configured to be controlled by the game application;
   receiving user input selecting a first route from a plurality of routes for an in-game event, wherein the first route is performed by at least one of the plurality of non-player controlled characters during the in-game event;
   in response to the user input, determining a first in-game waypoint path for a first non-player controlled character within the game environment that matches the first route;
   accessing a plurality of routes stored in a route database, wherein each route of the plurality of routes is generated based on telemetry data collected from movement performed along the route by a real world person;
   filtering the plurality of routes based on characteristics associated with the first in-game waypoint path using first route filtering criteria, resulting in a first subset of routes;
   analyzing the first subset of routes based on route selection characteristics associated with the first in-game waypoint path;
   in response to the analysis, selecting an event route from the first subset of routes based on the route selection characteristics;
   generating a character path for the first non-player controlled character, the character path comprising a start point and a destination point based, at least in part, on the event route, the character path comprising motion data associated with movement of the first non-player controlled character along the character path; and
   outputting the character path for execution by the first non-player controlled character prior to initiation of the in-game event.

2. The computer-implemented method of claim 1, the method further comprising:
   generating pose data for animation of the first non-player controlled character based on the motion data;
   selecting a pose from a pose database based on the pose data, wherein the pose data stored in the pose database is based on motion capture data; and
   rendering the selected pose within the game environment.

3. The computer-implemented method of claim 1, motion data for the character path includes position, orientation, speed, and acceleration.

4. The computer-implemented method of claim 1, wherein the first route filtering criteria include at least one of route type or relative move angle.

5. The computer-implemented method of claim 1, wherein the route selection characteristics include at least one of distance to defenders, distance to first down, receiver position, max speed, relative move angle, character position.

6. The computer-implemented method of claim 1, wherein analyzing the first subset of routes based on route selection characteristics includes generating a score for individual routes based on at least one of a length of the individual route from the first in-game waypoint path, end of first in-game waypoint path relative to end of the individual route, character position, or athlete that ran the individual route.

7. The computer-implemented method of claim 1, wherein generating a character path includes combining the event route as a segment with a procedurally generated segment to form the character path.

8. The computer-implemented method of claim 7, wherein the procedurally generated segment of the character path is generated based on real world pathing data.

9. The computer-implemented method of claim 1, wherein the route selection characteristics discards routes that do not satisfy a defined threshold.

10. The computer-implemented method of claim 1, wherein the character path is a pose trajectory matching path.

11. A computing system comprising:
    a data store storage device configured to store computer readable instructions configured to execute a game application and a route database comprising a plurality of routes, wherein each of the routes is generated based on telemetry data collected from movement performed along the route by a real world person;
    a processor configured to execute the game application, the game application configured to generate a game environment, the game application comprising a route generation engine configured to:
    receive user input selecting a first route for an in-game event, wherein the first route to be performed by at least one of a plurality of non-player controlled characters during an in-game event;

in response to the user input, determine a first in-game waypoint path for a first non-player controlled character within the game environment that matches the first route;

filter the plurality of routes based on characteristics associated with the first in-game waypoint path using first route filtering criteria resulting in a first subset of routes;

analyze the first subset of routes based on route selection characteristics associated with the first in-game waypoint path;

in response to the analysis, select an event route from the first subset of routes based on the route selection characteristics;

generate a character path for the first non-player controlled character, the character path comprising a start point and a destination point based, at least in part, on the event route, the character path comprising motion data associated with movement of the first non-player controlled character along the first character path; and output the character path for execution by the first non-player controlled character prior to initiation of the in-game event.

12. The system of claim 11, wherein the route generation engine is further configured to:

generate pose data for animation of the first non-player controlled character based on the motion data;

select a pose from a pose database based on the pose data, wherein the pose data stored in the pose database is based on motion capture data; and render the selected pose within the game environment.

13. The system of claim 11, wherein the motion data for the character path includes position, orientation, speed, and acceleration.

14. The system of claim 11, wherein the first route filtering criteria includes at least one of route type or relative move angle.

15. The system of claim 11, wherein the route selection characteristics includes at least one of distance to defenders, distance to first down, receiver position, max speed, relative move angle, character position.

16. The system of claim 11, wherein the route generation engine is further configured to generate a score for individual routes based on at least one of a length of the individual route from the first in-game waypoint path, end of first in-game waypoint path relative to end of the individual route, character position, or athlete that ran the individual route.

17. The system of claim 11, wherein the route generation engine is further configured to combine the event route as a segment with a procedurally generated segment to form the character path when generating a character path.

18. The system of claim 17, wherein the procedurally generated segment of the character path is generated based on real world pathing data.

19. The system of claim 11, wherein the route selection characteristics discards routes that do not satisfy a defined threshold.

20. The system of claim 11, wherein the character path is a pose trajectory matching path.

* * * * *

UNITED STATES PATENT AND TRADEMARK OFFICE
CERTIFICATE OF CORRECTION

| | | Page 1 of 1 |
|---|---|---|
| PATENT NO. | : 12,172,079 B2 | |
| APPLICATION NO. | : 17/384224 | |
| DATED | : December 24, 2024 | |
| INVENTOR(S) | : Ben Folsom Carter, Jr. et al. | |

It is certified that error appears in the above-identified patent and that said Letters Patent is hereby corrected as shown below:

In the Claims

Column 21, Claim 11, Line 20, delete "the first character" and insert -- the character --.

Signed and Sealed this
Twenty-sixth Day of August, 2025

Coke Morgan Stewart
*Acting Director of the United States Patent and Trademark Office*